United States Patent Office 3,453,486
Patented July 1, 1969

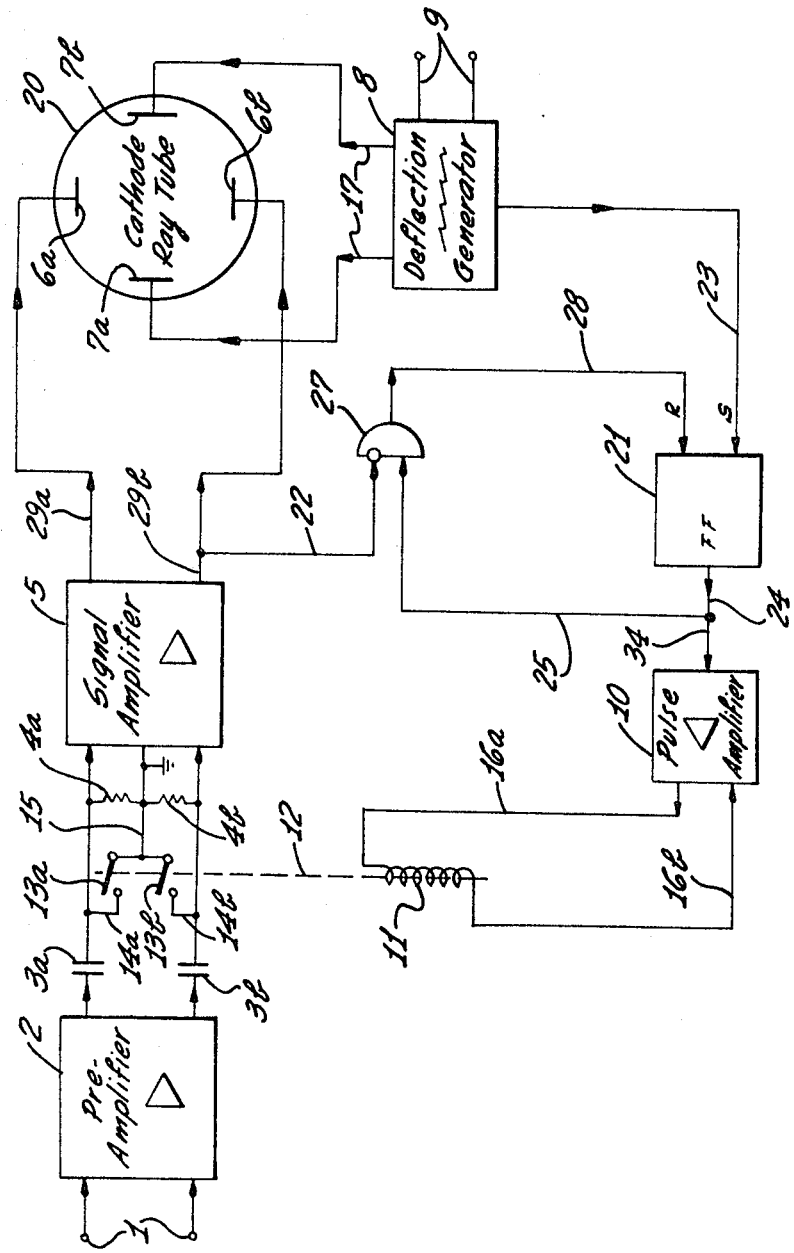

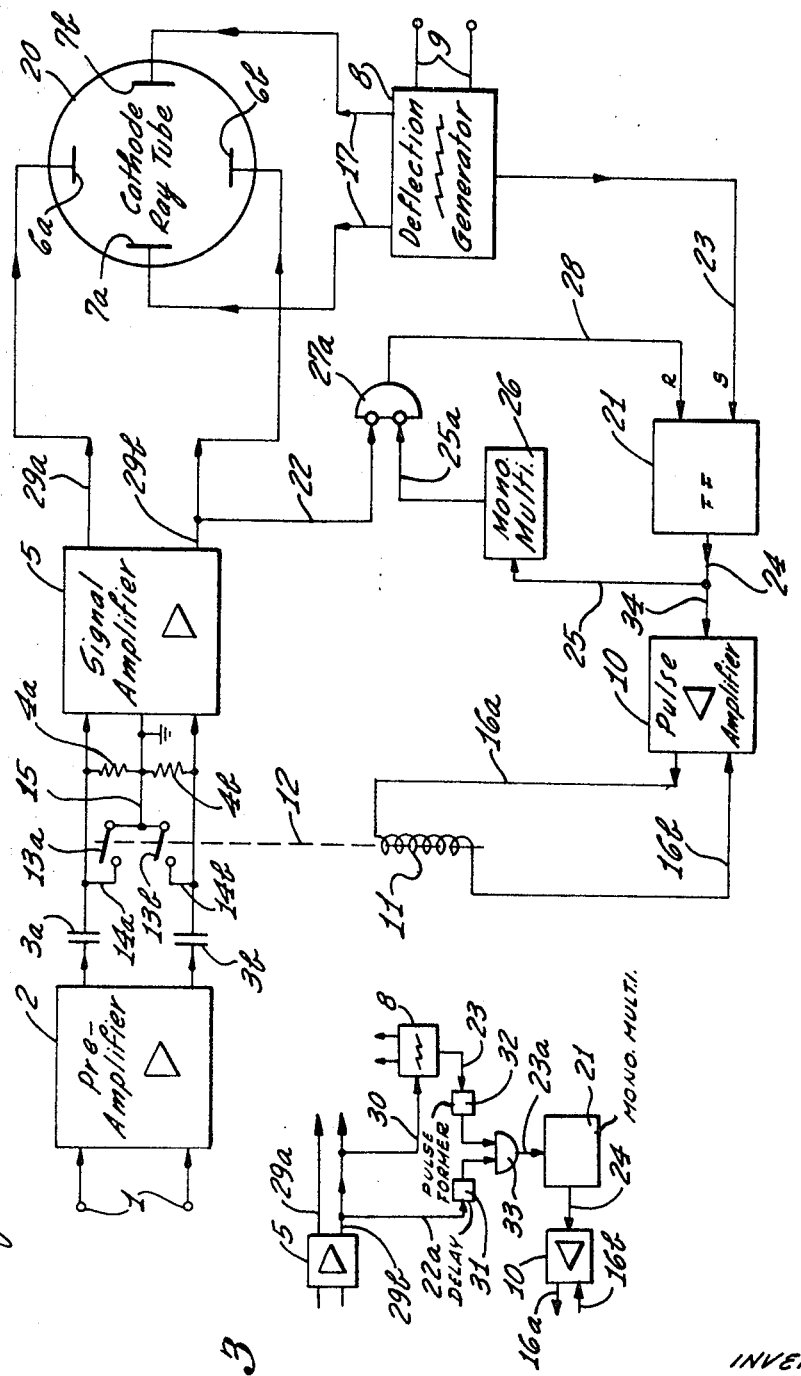

3,453,486
CIRCUIT FOR INDICATING DEVICES
Paul Weber, Freiburg im Breisgau, Germany, assignor to Fritz Hellige & Co., G.m.b.H., Freiburg im Breisgau, Germany
Filed June 21, 1967, Ser. No. 647,688
Claims priority, application Germany, June 25, 1966, H 59,777
Int. Cl. H01j 29/70
U.S. Cl. 315—25            7 Claims

ABSTRACT OF THE DISCLOSURE

This invention relates to a circuit for use with indicating instruments, such as oscilloscopes or graph recorders. The circuit permits a repetitive discharge of coupling condensers in the signal path, thereby minimizing the effects of overloading of the signal stages, and reduces the possibility of the displayed signal being driven off the screen. Simple logic circuitry and multivibrators enable the interruption to take place during a relatively unimportant part of the complete signal.

Background of the invention

This invention relates to a circuit improvement in indicating instruments, such as oscilloscopes or graph recorders, used for the visual and continual indication of small-amplitude signals of an order of magnitude of 1 mv., for example, for the indication of the physiological voltages produced by natural heart action.

The signal path of the amplifiers of such indicating instruments usually possesses at least one set of alternating current (AC) coupling components in order to suppress interference or stray noise components of signal frequencies smaller than the lower limit of the useful signal frequencies. This limit is approximately 0.3 cycle (Hertz) in cardiographic equipment.

The interference signals, which may be considered undesired stray voltages, are produced by what may be termed polarization voltages at the pick-up electrodes for the signals to be measured, or by movements of the test-object, in the case of physiological measurements, for example, by movements of muscles. These undesired voltages are very often several times larger than the useful signals, but have very low frequencies, and often may be regarded as direct current voltages. Therefore, they can be supressed or inhibited by resistance-capacitance (RC) high-pass coupling networks in the signal path, preferably at some point in the signal amplifier stages.

Such a high-pass coupling network, however, has the disadvantage that it may cause the time constant of the capacitor charge period to be too long, if interference voltages, which are normally practically constant, contain transient voltages. This can happen, for example, if the signal pick-up points of cardiographic equipment are changed by actuating special selector switches. This defect can be observed on the oscilloscope screen when it causes the zero or reference line of the oscilloscope, often called the time base line, to travel vertically more or less out of the image field, so that some useful signal information is lost during such time intervals. The duration of such a loss of signal is a function of the time constant of the charging period. After the termination of charging of the coupling condensers, which period is often of a duration of several time constants of the coupling components if large-amplitude interference voltages occur, the useful signals again appear on the screen. Also, during this charging period, the amplifier may be blocked, more or less, by being over-modulated or over-driven, thus posing a serious problem, inasmuch as during such over-modulation useful information is lost.

In connection with amplifiers used with indicating instruments, what is herein called unblocking circuits are known in the prior art. These circuits are either actuated manually, in order to be able to accelerate the charging of the coupling condensers caused by interference or stray signals during the measuring process, or automatically and synchronously actuated by other switches or devices of the apparatus, for example by a selector switch changing the input connections from one signal pick-up to another, or changing the actuation of the speed-selector switch for the recording tape of a graph recorder.

In each of these prior art methods, the desired effect is eventually obtained, but in an arbitrary manner and requires the conscious action or attention of the operator.

It is accordingly an object of the present invention to provide an improved unblocking circuit for use with indicating instruments.

Another object is to provide an unblocking circuit which is completely automatic and does not require personal attention on the part of an operator.

Still another object is to provide an unblocking circuit which does not result in the loss of significant useful information.

It is another object of the invention to provide an improved circuit for preventing overmodulation in indicating instruments.

Finally, another object is to provide an unblocking circuit wherein the duration of the period for unblocking is controllable.

Summary of the invention

Briefly stated, and in accordance with one embodiment of the present invention, an unblocking circuit is provided to connect the output terminals of the condensers of the high-pass RC-coupled filters with the reference- or zero-potential point of the amplifier for a short period of time, thus necessarily momentarily interrupting the incoming signal from the input to the indicating device. Of course, the direct current component of the input signal is also blocked by the coupling capacitors, but this is usually desirable, since commonly it is only the fluctuating component of the input signal that is of interest. The interruption is usually of a duration short enough so as to not result in a significant loss of desired signal. This shorting of the output terminals enables the condenser to discharge its charge within milliseconds or even fractions of a millisecond, provided that the internal impedances of the components lying at the input sides of the RC networks are sufficiently small. After the period of the capacitor discharge, the amplifier becomes unblocked, that is the period of overloading is terminated, and the amplifier is again able to function properly without the useful signals being overmodulated.

The unblocking circuit is triggered by a pulse derived, in the case of oscilloscopes, from the saw-tooth voltage used for the horizontal deflection of the cathode-ray beam of the oscilloscope. This unblocking circuit causes an increase in the rate of the charge or discharge of the coupling condenser in the signal path of the signal amplifier. When the unblocking circuit is triggered, the output terminals of the RC high-pass filter are connected directly to the zero-reference potential point of the amplifier, preferably during each retrace interval or shortly before the forward deflection interval, or trace time, for the cathode ray beam. Inasmuch as during the time of the retrace deflection the signal transmission is interrupted repeatedly in any case, the interposition of an interruption of the signal path at this time does not cause a serious loss of useful signal information. It should be noted that the method herein disclosed is particularly useful where periodically repeating signals of the same basic amplitude characteristics are involved.

Brief description of the drawings

For a complete understanding of the invention, together with other objects and advantages thereof, reference may be had to the accompanying drawings, in which:

FIGURE 1 shows a schematic and diagrammatic drawing of one embodiment of an interruption circuit for improving the response, to an input signal, of an oscilloscope.

FIGURE 2 is a similar type of drawing showing another embodiment having a more refined control of the duration of the period during which the input signal is interrupted.

FIGURE 3 is also a schematic and diagrammatic drawing showing an embodiment having another type of refined control of the duration of the interruption of the input signal.

Description of the preferred embodiments

The invention shall now be described with reference to the circuit block diagram of an oscilloscope whose input is interrupted in a manner according to this invention, as shown in FIGURE 1. The signals to be displayed, for example the voltages caused by physiological or biological action, are picked up by pick-up electrodes 1 and connected to the input to a preamplifier 2. Between this preamplifier 2 and the amplifier 5 for the signal voltage, or between two amplifying stages, the RC-coupled components representing a high-pass filter are inserted. These elements comprise coupling condensers 3a and 3b and shunt resistors 4a and 4b. There are two pairs of these coupling members present, owing to the fact that a push-pull amplifier is used in the illustrated embodiment, since it simplifies the explanation of the invention. The shunt resistors 4a and 4b, generally of high ohmic value, are inserted between the output sides of the coupling condensers 3a and 3b, respectively, and the line 15 designating the reference potential or ground of the signal amplifier stages. The two output terminals 29a and 29b of the push-pull signal amplifier 5 are connected to the two vertical deflection plates 6a and 6b, respectively, of the cathode ray tube 20, and produce there an electric potential proportional to the amplitude of the input signal on leads 29a and 29b, causing the cathode ray beam to be deflected vertically in accordance with the input voltage to the oscilloscope. The horizontal deflection voltage, produced by a saw-tooth, or deflection, generator 8 is connected to the horizontal deflection plates 7a and 7b of the oscilloscope. The deflection generator 8 is either controlled synchronously or by special triggering signals delivered to its input leads 9. The switching or deflection circuitry included in block 8 is well known to those skilled in the art, and is not further discussed herein.

According to the teaching of this invention, additional circuit means are provided, being triggered by the deflection generator 8 and causing a short-circuit across the resistors 4a and 4b of the RC-coupling components for a short time during or after every reverse deflection interval, that is, during the retrace interval. Of course, the input signal may be interrupted at any other instant, but the two mentioned periods are usually the most advantageous. In order to achieve the short-circuiting, short-circuit lines 14a and 14b, each connected to relay contacts 13a and 13b, respectively, are shunted across the shunt resistances 4a and 4b, respectively, of the RC-coupling components to the signal amplifier 5. For the actuation of the relay contacts 13a and 13b, a switch relay 11 is provided, controlled directly or indirectly by pulses derived from the saw-tooth, or deflection, generator 8, the relay 11 being mechanically coupled to the contacts 13a and 13b by the plunger 12 (shown by dashed lines).

Between the deflection or saw-tooth generator 8 and the switch relay 11 are interposed a pulse-forming stage, or pulse generator 21, and a pulse amplifier 10. Leads 24 and 34 connect the pulse generator 21 to the pulse amplifier 10. Leads 16a and 16b connect pulse amplifier 10 to relay 11.

Actuating current for energizing the switch relay 11 may consist of square-wave pulses whose frequency is synchronous with the saw-tooth pulses formed by the deflection generator 8. For example, the pulse-forming stage, or pulse generator, 21 may consist of a monostable multivibrator, triggered at every maximum, or peak, of the saw-tooth voltage used for the deflection of the electron beam, and then furnishing the actuating current for the relay 11 for a short time interval, whose duration may be chosen as desired. During this interval, the relay switch 11 is energized and closes both short-circuit contacts 13a and 13b, thus interrupting the input signal from the signal amplifier 5 and causing the discharge of the coupling condensers 3a and 3b to the reference potential line 15.

With normally used speeds of the time deflection signals of about 25 mm./sec. to 50 mm./sec., and with the normal width of the screen of the cathode ray tube having a diameter of 75 mm., for example, the periodic interruption triggered by the saw tooth voltage of the deflection generator 8 and with it the retrace of the zero or time base, or reference, line would repeat every 1.5 to 3 seconds. This would ensure that starting of the sweep of the cathode ray beam would be initiated always at the same point, or level, on the Y-axis of the screen.

The duration of time required for interrupting the signal to the signal amplifier 5, that is, the duration of time of short-circuiting of the resistors of the RC-coupling components of the amplifier 5 is determined by the time constant of the involved RC-coupling component members, that is the time constant of the coupling components short-circuited at their output. This time constant is a function of the internal impedance of the preamplifier 2 in combination with the internal impedance across the two electrodes 1 and of the capacitances of the condensers 3a and 3b. A time constant of about 10 milliseconds can be attained without difficulty so that, taking the length of interruption time of the signal amplifier 5 at 50 milliseconds, this means that during a time five times greater than the discharge time constant of the components mentioned hereinabove, one single discharge is occurring, so that the interfering, or stray, signals would have decreased to $e.^{-5}$ of their starting value, that is to about 0.7% of the starting value. Owing to the fact that the discharges repeat within short intervals, interference voltages having a large magnitude could be made ineffective with respect to the desired input signal.

There are two favorable periods, mentioned above, for the interruption of the input signal which have minimal effect as far as a loss of useful signal is concerned. First, a pulse could be derived from the deflection generator 8 which would be concurrent with the beginning of the retrace period. In this case it is immaterial whether the deflection voltage is free-running and synchronized by the input signal or free-running and not synchronized by the signal, that is, free-running and triggered from the signal, or free-running and self-triggered. In this case, the required time to discharge the coupling condensers during the interruption interval should be shorter than the retrace period.

The other favorable period for the interruption of the input signal is at the beginning of the forward deflection of the cathode ray beam. The initiation of the interruption may also be caused by a pulse derived from the deflection generator 8 placed at the start of the forward sweep or trace. In this second favorable period, the starting of the forward sweep of the beam should suitably be placed far enough outside the rim of the screen, usually to the left of the screen, so that the interruption time will have ended when the electron beam enters the visible zone of the screen. With this second procedure, some signal information is lost during the interruption time, but this is not serious, remembering that the interruption time, taken for this example, of 50 milliseconds at a deflection speed of 50 mm./sec. means a gap of information of not more than 2.5 mm. along an X-axis having a length of 75 mm.

The procedure of interrupting the signal to the amplifier 5 of indicating instruments, such as oscilloscopes, proposed by this invention, and the necessary mode for realizing it, is discussed in the balance of this disclosure. It would of course be advantageous if the end of the interruption time, that is the time when the signal again appears at the input of the signal amplifier 5, would be placed in such a manner that the amplitude of the instantaneous voltage of the signal to be displayed would be zero at exactly this moment. This would ensure a minimal vertical displacement of the time base line.

Referring now to FIGURE 1, one way which can be accomplished is by using a flip flop or bistable multivibrator as a pulse generator 21, instead of a monostable multivibrator previously mentioned, as a source of the current pulses for the blocking relay switch 11. For initiating the interruption, this bistable multivibrator 21 is triggered by pulses derived from the saw-tooth voltage of the deflection generator 8, with a delay circuit (not shown) if required, but for termination of the interruption it is triggered at a moment that the signal is passing through the zero-line, that is at an instant when the instantaneous value of the input signal is zero.

If such a flip flop is used as a pulse-forming stage, or pulse generator 21, additional auxiliary equipment must be added as shown in FIGURE 1. The flip flop 21, serving as a pulse generator can be triggered by the peaks, for example, of the saw-tooth voltage produced by the deflection generator 8. Then the output signal at 24 of the flip flop 21, after being amplified in the pulse amplifier 10, energizes or feeds the relay switch 11. This causes the discharge of capacitors 3a and 3b and eliminates the blocking of the signal amplifier 5 due to overloading at the input. The pulse appearing at the output 24 of the flip flop 21 also passes through the conductor 25 to an AND gate 27, the other input of which is connected to one of the signal transmission lines 29b through line 22, and forms a negation input to AND gate 27. In other words, AND gate 27 will have an output on line 28 only if the input on line 22 passes through zero, or is at a zero level, concurrently with a pulse on line 25. The output 28 of the AND gate 27, which output 28 is connected to the second input of the flip flop 21, furnishes a pulse for reversing the flip flop 21 only if the flip flop 21 had already been set before into a state energizing relay 11 and if the input signal to the oscilloscope is at zero level.

In order to ensure that this reversal of the state of flip flop 21 does not happen prematurely, that is, that the duration of the signal interruption is long enough, it may be necessary to also insert a delay switch, for example, in the form of a monostable multivibrator, into controlling line 25a. FIGURE 2 shows a second embodiment of the invention incorporating such a delay switch. In this case, the input of the line 25a into the AND gate 27a is also a negation input. A negation input is very often shown, as in FIGURES 1 and 2, by a dot at the input. The input should be a negation gate in order to ensure that in all cases the flip flop, or bistable multivibrator 21 should not be set into its zero-condition earlier than is determined by the adjustable time period of the squarewave pulses of the monostable multivibrator 26.

Both embodiments are workable only if the zero-position of the signal is defined with enough precision, which unfortunately is just not the case with signal amplifiers of very low limiting frequency, such as equipment useful for biological testing. Moreover, oftentimes the amplitude excursions are very broad, and it is difficult to determine where the pulse starts and where it ends. In these cases a simple solution for the problem is possible by defining the moment at which the amplifier should be blocked that it meets two conditions. For example, in the case of instruments used for cardiographic measurements, one condition could be that the blocking pulse occurs during the retrace period of the oscilloscope, and the other condition, that the blocking pulse be synchronized with some definite point of the voltage curve corresponding to the heart action. In the situation where one of the portions of a waveform with which it is desired to synchronize is not sharply defined, then a sharply defined portion of the waveform, which must be repetitive, is chosen, and a phase delay circuit used. For example, for cardiographic measurements, what is called the R-spike, or pulse, is sharply defined and may be used, after a phase delay, to concur with the retrace period.

Another embodiment of the invention herein described is shown in the block diagram of FIGURE 3. Here is shown a monostable multivibrator used as a pulse-forming stage, or pulse generator 21, at the output 24 of which the drive current for the relay 11 is delivered, after being amplified by the pulse amplifier 10. The pulse generator 21 is triggered at its input 23a by the output signal from an AND gate 33, one input of which is connected to one of the leads 29b of the signal transmission line through line 22a, and the other input of which is connected to the deflection generator 8 by the line 23. If required, pulse forming stages and/or delay stages are inserted, indicated by the blocks 31 and 32. In FIGURE 3, block 31 designates a delay network, whereas block 32 designates a pulse former or shaper. The delay network 31 ensures that one of the inputs to AND gate 33 has the desired phase relationship to any specific part of the input signal. It would not be difficult to have an output from pulse shaper 32 timed to concur with the retrace or early trace period of the saw-tooth voltage formed by deflection generator 8. In other situations, the positions of the two circuits 31 and 32 might be reversed, or one or both of them might be missing entirely. The circuits are so arranged that the moment for, or time of, interruption of the circuit occurs during the concurrence of a relatively unimportant part of the input signal and either the retrace period or at the beginning of the forward sweep, or trace, period. The duration of the interruption has to be adjusted at the pulseforming stage 32, in either a fixed or an adjustable manner. In most oscilloscopes, it is possible to trigger the horizontal deflection, or sweep, of the cathode ray beam by pulses derived from the input signal itself, for which purpose the conductor 30 connecting the signal transmission line 29b with the horizontal sweep generator 8, may be used.

By either of these alternate embodiments, a vertical displacement of the displayed signal, which would be undesirable even though small, can be eliminated or minimized. This displacement can occur if the signal amplifier 5 is over-modulated due to the arrival of a signal of large amplitude. With an input signal of normal amplitude, the vertical Y-deflection of the cathode ray beam takes place at a defined place on the screen. In the case of an over-modulated input signal, the zero-line or time base line, of the signal would occur at the start of the trace period at a vertical level which depends upon the value of the over-modulated signal, a little above or below the steady-state line and return to the steady-state line only after some delay, depending on the time constant of the RC-coupling components.

Thus the invention results in a practical and valuable improvement for the reproduction of small signal voltages by means of recording devices, such as oscilloscopes. For the use of such devices, for example to monitor the heart activity of patients, the suppression or elimination of interference in the signal displayed has great practical importance.

Whereas three preferred embodiments of the invention have been shown and described herein, it should be realized that there are many modifications, substitutions and alterations thereto falling within the spirit of the invention. While the improvement herein disclosed was developed for use with amplifiers for small-amplitude signals, it will be apparent from the disclosure that the improvement can be useful, also, where large-amplitude signals are involved. Moreover, while the foregoing description of the invention is specifically directed for use with an oscilloscope, the scope of the invention is not intended to be restricted to an oscilloscope, but may be used with other indicating instruments, such as graph recorders. Also, instead of a mechanical relay switch, a relay completely electronically-actuated could be used, in a manner similar to that shown in the figures. Moreover, delay devices could be used, other than those already indicated, which initiate or terminate the blocking of the amplifier 5 within a definite time after having received the corresponding triggering pulses.

What is claimed is:

1. An indicating device including a display tube having respective vertical deflection and horizontal deflection inputs, a first deflection circuit for applying signals to said respective vertical deflection inputs, a second deflection circuit for applying signals to said respective horizontal deflection inputs, and an unblocking circuit comprising:
    RC coupling means connected to the input of said first deflection circuit for providing high-pass coupling in the signal path to said first deflection circuit;
    pulse forming means for providing a pulse to said RC coupling means so as to automatically discharge said RC coupling means; and
    circuit means coupled to said pulse forming means for ensuring that said pulse is provided to said RC coupling means between the useful sweep trace periods of said display tube.

2. An indicating device as recited in claim 1 wherein said circuit means comprises:
    path means coupled between said second deflection means and said pulse forming means for ensuring the initiation of said pulse; and
    logic means having a first input and a second input connected to said pulse forming means and said first deflection circuit, respectively, and further having an output connected to said pulse forming means, for determining the width of said pulse.

3. An indicating device as recited in claim 2 wherein RC coupling means includes at least one capacitor and a relay-controlled switch adapted to receive said pulse and further adapted to discharge said capacitor to ground.

4. An indicating device as recited in claim 1 wherein said circuit means comprises:
    path means coupled between said second deflection means and said pulse forming means for ensuring the initiation of said pulse;
    delay means connected to an output of said pulse forming means for delaying an output signal of pulse forming means; and
    logic means having a first and a second input connected to said delay means and said first deflection circuit, respectively, and further having an output connected to said pulse forming means, for determining the width of said pulse.

5. An indicating device as recited in claim 1 wherein said circuit means comprises:
    first path means coupled between said first deflection circuit and said second deflection circuit for triggering said second deflection circuit; and
    logic means connected to said pulse forming means for determining the width of said pulse, said logic means including second path means connected to an output of said first deflection circuit and third path means connected to an output of said second deflection means for receiving respective signals from said outputs, respectively, for controlling the output of said logic means.

6. An indicating device as recited in claim 5 wherein said second path means includes a delay network.

7. An indicating device as recited in claim 6 wherein said third path means includes a pulse shaper.

References Cited

UNITED STATES PATENTS 3,390,302   6/1968   Strathman et al. ------ 315—25

RICHARD A. FARLEY, *Primary Examiner.*

T. H. TUBBESING, *Assistant Examiner.*

U.S. Cl. X.R.

128—2.06